(12) United States Patent
Byun et al.

(10) Patent No.: US 12,305,053 B2
(45) Date of Patent: May 20, 2025

(54) CONDUCTIVE INK COMPOSITION (71) Applicant: ENJET CO. LTD., Gyeonggi-do (KR)

(72) Inventors: Do Young Byun, Seoul (KR); Won Il Son, Daejeon (KR)

(73) Assignee: ENJET CO. LTD., Suwon-si (KR)

(*) Notice: Subject to any disclaimer, the term of this patent is extended or adjusted under 35 U.S.C. 154(b) by 862 days.

(21) Appl. No.: 17/191,800

(22) Filed: Mar. 4, 2021

(65) Prior Publication Data
US 2021/0277270 A1  Sep. 9, 2021

(30) Foreign Application Priority Data
Mar. 5, 2020  (KR) .................. 10-2020-0027874

(51) Int. Cl.
C09D 11/52 (2014.01)
C09D 11/037 (2014.01)
C09D 11/102 (2014.01)
C09D 11/322 (2014.01)
H01B 1/22 (2006.01)

(52) U.S. Cl.
CPC ............ C09D 11/52 (2013.01); C09D 11/037 (2013.01); C09D 11/102 (2013.01); C09D 11/322 (2013.01); H01B 1/22 (2013.01)

(58) Field of Classification Search
CPC ...................................... C09D 11/52
See application file for complete search history.

(56) References Cited

U.S. PATENT DOCUMENTS

| | | | | |
|---|---|---|---|---|
| 6,322,620 B1* | 11/2001 | Xiao | ............ | C09D 11/52 523/460 |
| 2006/0001726 A1* | 1/2006 | Kodas | ............ | C23C 18/08 347/105 |
| 2017/0320994 A1* | 11/2017 | Arita | ............ | C09K 5/14 |

* cited by examiner

Primary Examiner — Ian A Rummel (57) ABSTRACT

A conductive ink composition according to the present disclosure is a conductive ink composition that can be printed on a substrate, and this conductive ink composition includes a first metal precursor of which a first metal ion may be reduced to a first metal by heat, to form a conductive coating film on the substrate, and a photothermal material for absorbing light energy such as laser and discharges the heat to surroundings, to raise the surrounding temperature to a temperature not below the temperature at which the first metal ion may be reduced, and therefore the present disclosure enables to easily form a coating film that includes a conductive first metal regarding a disconnected point during a process of forming a fine pattern, thereby enabling efficient repair.

8 Claims, 5 Drawing Sheets

CONDUCTIVE INK COMPOSITION

RELATED APPLICATION

This application claims the benefit of priority of Korean Patent Application No. 10-2020-0027874 filed on Mar. 5, 2020, the contents of which are incorporated herein by reference in their entirety.

FIELD AND BACKGROUND OF THE INVENTION

The present disclosure relates to a conductive ink composition, and more specifically, to a conductive ink composition for solving a defect such as disconnection occurring during a process of forming a fine pattern.

The process of forming a thin film transistor of a liquid crystal display device is similar to that of a semiconductor. A formed pattern has a very small size of several micrometers (μm).

It is very difficult to completely prevent the occurrence of defective formation of a fine pattern during the process of forming a thin film transistor. Defective formations of a fine pattern include short circuits caused by conductive foreign substances between data signal wirings, and pattern disconnections due to loss of the fine pattern during stepper exposure, etc. When a disconnection or a short circuit failure occurs, and the actual panel is driven, the pattern will sometimes look like a dot or a line, and this defect is called bad pixel.

The most frequent phenomenon of the causes of bad pixel is defective disconnection of a thin film transistor wiring. In the thin film transistor signal wiring, a gate signal wiring and a data signal wiring are arranged in a matrix form at regular intervals in vertical directions respectively, and if a disconnection occurs in either of these two wirings, the bad pixel occurs. Such disconnected parts can be resolved through a repairing process, and a typical example is the repairing process using laser chemical vapor deposition (LCVD).

LCVD can be performed using laser, and this reaction can be classified as either a photochemical reaction or photothermal reaction. Photochemical reaction is a method where photons of a laser beam decompose organometallic to deposit a thin metal film. While this process decomposes good organometallics, it also has a disadvantage that the surface of a material has to be heated up to 200° C. or above, the deposited film can be contaminated with carbon, and that it has poor electrical properties.

In the photothermal method, the laser beam acts as a heat source to heat the substrate, and thermally decomposes gaseous organometallics on the surface, thereby depositing the metal film. There is an advantage that the purity of the metal that can be produced by this method is very high, that is, not below 95%, and the deposited film has a thin film resistance of approximately 3 to 5 times that of a solid metal. However, this method has a problem that it requires high-power laser that has several to tens of $MW/cm^2$ of laser power density, and high vacuum of 0.1 to 100 torr of partial pressure, thus making the equipment for the process expensive.

PRIOR ART LITERATURE

Patent Literature (Patent Literature 0001) Korean Laid-open Patent No. 10-2011-0046439

SUMMARY OF THE INVENTION

A purpose of one aspect of the present disclosure is to provide a conductive ink composition with which a disconnection of a pattern that occurs during a process of forming an electrode can be repaired and thus reconnected in a convenient and economic way without using expensive vacuum equipment or a high-power laser.

One aspect of the present disclosure is a conductive ink composition that can be printed on a substrate, the conductive ink composition including:
 a first metal precursor solution including a first metal ion, the first metal ion being reduced to a first metal; and
 a photothermal material that absorbs light energy from outside and discharges as heat, to provide the heat for reducing the first metal ion to the first metal ion.

It is preferable that the conductive ink composition further includes a second metal precursor solution that includes a second metal ion being reduced to a second metal at or below a temperature at which the first metal ion is reduced.

It is preferable that the second metal melts at or below a temperature at which the first metal ion is reduced.

Further, it is preferable that the first metal precursor solution includes organic salt, inorganic salt or complex compound of the first metal.

It is preferable that the second metal ion melts after being reduced to the second metal, and is alloyed with an electrode or coating film provided on the substrate or form an intermetallic compound with an electrode or coating film provided on the substrate.

Here, it is preferable that the content of the first metal ion is 2 to 20 wt % of the conductive ink composition.

It is preferable that the photothermal material includes particles including a metal selected from a group consisting of Au, Al, Cu, Au, Pt, W, Cr, Ti, Co, Ni, Pb, Sn, Ge, Pd, and Si, oxide of the selected metal, or alloy of the selected metal.

It is preferable that size of the particle of the photothermal material is 1 to 1000 nm.

Further, the photothermal material included may be 5 to 30 parts by weight of 100 parts by weight of the first metal precursor solution.

It is preferable that the light energy is supplied from a laser having beam intensity of 2000 to 5000 $W/cm^2$.

Further, the conductive ink composition may further include a binder for immobilizing the conductive ink composition on the substrate; and
 a curing agent for reacting with the binder and curing the binder.

It is preferable that the binder includes an epoxy resin.

It is preferable that the binder included is 7 to 50 parts by weight of 100 parts by weight of the first metal precursor solution.

Further, the conductive ink composition may further include a curing accelerator for accelerating reaction of the binder and the curing agent.

Here, it is preferable that the curing accelerator included is 0.1 to 17 parts by weight of 100 parts by weight of the first metal precursor solution.

It is preferable that the conductive ink composition is cured by the reaction of the binder and the curing agent, to have a shear stress of 35 to 100 kgf.

It is preferable that a viscosity of the conductive ink composition measured under 25° C. condition is 5 to 1000 cPs.

Another aspect of the present disclosure is a conductive coating film provided with the above-mentioned conductive ink composition on a substrate, the conductive coating film electrically connecting two or more different points on the substrate.

It is preferable that, on the conductive coating film, electrical resistance measured by 2-point probe method regarding two points that are 40 μm apart from each other is 5 to 10052/40 μm.

It is preferable that line width of the conductive coating film is 0.1 to 20 μm.

A conductive ink composition according to one aspect of the present disclosure may be printed on a disconnected area that may occur when forming a fine pattern of a substrate or an electronic component, and contain a photothermal material to convert light energy into thermal energy, to reduce a first metal ion contained in a first metal precursor, thereby providing connection of a disconnection through a conductive coating film with a low electrical resistance.

Further, even when using a low-power laser, it is possible to proceed with a reduction reaction of a first metal ion on a fine area, and thus there is an advantage of minimizing damage to the substrate while repairing the disconnection economically.

DESCRIPTION OF SPECIFIC EMBODIMENTS OF THE INVENTION

Prior to describing the present disclosure in detail hereinbelow, it should be understood that the terms used in the present specification are solely for the purpose of describing specific embodiments, and not to limit the scope of the present disclosure that is limited only by the scope of the claims attached hereto. All technical terms and science terms used in the present specification have the same meaning as should be generally understood by a person with ordinary skill in the related art unless it is mentioned otherwise.

Here, 1) shapes, sizes, ratios, angles and counts illustrated in the drawings attached are rough measurements and are thus subject to change. 2) The drawings are illustrated from the prospective of an observer, and thus the direction or position of describing the drawings may vary depending on the location of the observer. 3) Like reference numerals may be used to indicate like components.

4) When 'comprise', 'comprises', or 'comprising' is used, other parts may be added unless the expression 'only' is used. 5) When something is described in a singular form, it may also be construed as being plural. 6) Even when a shape, comparison of size, or locational relationship is not described with 'approximately', 'about', or 'actually', it should be construed as including a normal error range.

7) Even when terms such as 'after, 'before', 'followed by', 'subsequent to', or 'here' is used, it should not be used to limit the temporal position. 8) Terms such as 'first', 'second', and 'third' are used as a selective, alternative, or repetitive meaning of simply for the convenience of classification, and should not be construed to have a limitative meaning.

9) When a locational relationship of two parts is described with terms such as 'on', 'above', 'below', 'next to', 'at the side of', and 'between', one or more other parts may be located between those two parts unless 'directly' is used. 10) When parts are electrically connected with 'or', they should be construed to mean not only solely but also in combinations, but when the parts are electrically connected with 'or~, one of~', they should be construed to mean solely.

In the present specification, shear stress means a stress that resists a shear force, which is a force applied perpendicular to a surface, in opposition to an offset force acting in the opposite direction. For example, it can mean a force that can resist a force of pushing a coating film formed on a substrate towards one direction in parallel along the substrate surface, and moreover, a force that immobilizes the coating film on the substrate so that it is not deformed or separated on the substrate.

A conductive ink composition, that is one aspect of the present disclosure, may be prepared to include a first metal precursor solution, a photothermal material, a binder, a curing agent, a curing accelerator, and a solvent.

The first metal precursor solution may include a compound that includes a first metal cation in oxidized form, or it may be used in a broader meaning that includes a compound including a first metal cation that can be reduced to a first metal. The first metal precursor solution is a solution that includes a first metal precursor, that makes the conductive ink composition show electrical properties, and where the reduced first metal forms the coating film, thereby enabling an electrical connection between desired points.

There is no limitation to the form of the first metal precursor or the type of the anion, but metal hydride, metal hydroxide, metal sulfur oxide, metal nitrate, metal halide, complex compound, or a combination thereof may be used.

Although there is no limitation to the type of the first metal, it should be a metal that can be easily reduced, with an excellent electrical conductivity, and an appropriate melting point, and preferably, silver (Ag) may be used.

The first metal precursor solution is a solution that includes a first metal precursor. It may include the first metal precursor dissolved in a solvent and made to have an ink form. The first metal precursor solution may be 10 to 80 wt % of the total conductive ink composition, and preferably, 30 to 70 wt %.

The first metal precursor solution should include a first metal cation, that is an oxidized form of the first metal (hereinbelow referred to as a first metal ion), and the amount of the first metal ion included in the first metal precursor solution may be 2 to 20 wt % of the total conductive ink composition, and preferably, 5 to 15 wt % of the total conductive ink composition.

The first metal ion of the first metal precursor included in the first metal precursor solution may be reduced to a first metal atom, for example, by heat, and the first metal coating film formed by the first metal precursor solution may have a high electrical conductivity and low electrical resistance, and connect an electrode with another electrode. Reduction of the first metal is used to have the same meaning as the reduction of the first metal ion included in the first metal precursor solution, and reduction of the first metal ion may be done by thermal energy.

When referring to the temperature at which the reduction of the first metal ion included in the first metal precursor occurs as a reduction temperature, the reduction temperature may differ depending on the type of the first metal precursor, and this reduction reaction may occur as energy is transferred from surroundings or from outside for the reduction. The temperature raised by absorbing energy or heat may differ depending on the equipment used for supplying the energy or the surrounding environment.

The first metal precursor solution may further include a menstruum that can dissolve the first metal precursor. There is no limitation to the component of the menstruum as long as it is a menstruum that can dissolve the first metal precursor, but it is desirable to use a polar menstruum having a small reactivity with the first metal ion or the first metal precursor and a high volatility, for example, ethyl acetate, acetone, tetrahydrofuran, and acetonitrile.

The menstruum may be one having the same component as the solvent to be described below, and that may be included in the conductive ink composition and mixed together, and it is also possible to include a different composition depending on the component of the solvent. In a case where the solvent has the same component as the solvent, there is an advantage that dissolution occurs easily when mixed with the conductive ink composition.

The first metal precursor solution may include a precursor of another metal together with the first metal precursor. Here, it is preferable to include a precursor of a second metal that is a metal having a lower melting point than the reduction temperature. Low melting point metals such as, for example, Indium (In), Bismuth (Bi), and Tin (Sn) may be used as the second metal.

The second metal should be included in the first metal precursor solution in the form of a second metal precursor that includes a second metal ion or a second metal in an oxidized form, and the second metal precursor included in the first metal precursor solution should be 0.1 to 1.0 times that of the first metal precursor, and preferably 0.3 to 0.7 times that of the first metal precursor. The second metal ion can be reduced to the second metal depending on an increase of surrounding temperature caused by a photothermal action. The reduced second metal has a lower melting point than its reduction temperature at which the first metal ion can be reduced, and thus the reduced second metal may be phase-changed to a liquid metal state and melted therein.

Here, it is preferable that the first metal has a higher melting point than the temperature at which the first metal ion can be reduced, so that the first metal does not melt.

The melted second metal may be alloyed or form an intermetallic compound between a conductive coating film including a reduced first metal formed on a substrate and an electrode formed on the substrate, and therefore firmly bind the conductive coating film and the substrate electrode, thereby having an effect of improving the adhesion force.

The photothermal material may be a material that can cause a photothermal effect, that is an effect of absorbing light and generating heat.

Since this material can convert the absorbed light energy, that is, electromagnetic energy into heat, it may be used in various fields such as photothermal treatment, solar cells, cell harvest, and temperature adjustment of spaceships. Such photothermal material can be found mainly in materials including metal or nano materials.

There is no limitation to the material of the photothermal material. It may be of a metal material or inorganic metal particles, or a combination of a metal and inorganic metal particles.

Specifically, the photothermal material may include one or more metal selected from a group consisting of Au, Al, Cu, Au, Pt, W, Cr, Ti, Co, Ni, Pb, Sn, Ge, Pd, Ce and Si, an oxide of the metal, or an alloy of the metal, and the photothermal material may be carbon nanotube or graphene oxide. The photothermal material may be, for example, gold nano particles, gold nanorods, Au/Ag nanoparticles, CoCu, CoPt, FePt, NiFe, or NiFeCo. Here, nano particles may be construed to have a broad meaning including nanoshells that include spheres, rods, and hollows.

There is no limitation to the form of the photothermal material, but it is preferable that it has a particle form. The size of the photothermal material particle may have a range of 1 to 1000 nm, and preferably 10 to 500 nm.

If the particle size of the photothermal material is smaller than the above range, it will be difficult to prepare it as metal nano particles, and the contents of a dispersant for dispersing the composition and organic substances such as an anti-sedimentation agent for preventing sedimentation and the like will increase, thereby increasing the electrical resistance, which is a problem. If the particle size of the photothermal material is greater than the above range, there will be a problem where the photothermal effect will decrease, preventing the reduction of the first metal ion from occurring, or the reduction occurring at a lower ratio.

The photothermal material may be 5 to 30 parts by weight, and preferably, 6 to 25 parts by weight, of 100 parts by weight of the first metal precursor solution.

If the ratio of the photothermal material is smaller than the above range, the effect of a photothermal action caused by laser will be small, preventing the first metal precursor from being sufficiently pyrolyzed, and thereby increasing the electrical resistance. If the ratio is greater than the above range and metal oxide is used as the photothermal material, the photothermal effect caused by the photothermal material may become sufficient, but there will be a problem where the electrical resistance of the metal oxide itself will become very high, thereby increasing the overall resistance of the formed electrode itself.

The photothermal material absorbs light energy and discharges thermal energy to the surroundings, and although there is no limitation to the supply source of the light energy, it is preferable to use a laser suitable to supply light energy to a desired area. The intensity of the laser beam may be 2,000 to 5,000 $W/cm^2$, and preferably, 3,000 to 4,000 $W/cm^2$.

If the intensity of the laser beam is higher than the above range, there will be a problem that the substrate will be damaged, and if the intensity of the laser beam is lower than the above range, there will be a problem where the photothermal action will be insufficient to raise the temperature to the reduction temperature, or the reduction will be insufficient, thereby increasing the electrical resistance of the conductive coating film.

Due to the photothermal effect caused by the photothermal material, in the conductive ink composition of the present disclosure, reduction of the first metal precursor can occur efficiently under atmospheric pressure condition compared to the chemical vapor deposition method of prior art that requires a high vacuum condition, and therefore obtain an advantageous effect.

The binder may be immobilized on the substrate where the conductive ink composition is processed so that electrical connection may be maintained with stability. The binder may also prevent the phenomenon from occurring where the first metal obtained from reduction of the first metal ion caused by the photothermal effect is detached or peeled off from the substrate, causing disconnection.

There is no limitation to the material of the binder, but it is preferable to use, for example, an epoxy resin. A material that contains two or more epoxy groups per molecule may be used as the epoxy resin. These materials include bisphenol A type epoxy resin, alicyclic epoxy resin, linear aliphatic epoxy resin, cresol novolac type epoxy resin, biphenyl type epoxy resin, cresol novolac type epoxy resin, linear aliphatic epoxy resin, heterocyclic epoxyresin, and halogenated epoxy resin. Further, two or more of the above-mentioned epoxy resins may be used in combinations.

The binder included may be 7 to 50 parts by weight of the total 100 parts by weight of the first metal precursor solution, and preferably, 8 to 50 parts by weight, and more preferably 8 to 25 parts by weight of the total 100 parts by weight of the first metal precursor solution.

If a smaller amount than the above range is used, there is a possibility to cause a defective attachment between the cured composition or the coating film and the substrate, and if the binder used exceeds the above range, there will be a problem of increasing the electrical resistance of the cured composition or the conductive coating film.

Before the temperature increases due to the photothermal effect, the binder may not provide the sufficient immobilizing force to the conductive ink composition. By the photothermal effect and curing reaction, the binder may be cured to perform the role of immobilizing the first metal obtained from the reduction of the first metal precursor, on the substrate. Due to this nature, the composition may be printed or applied on a disconnected part of the substrate in the form of fluid that is not cured, and may be particularly formed in a narrow width and thickness, to provide an effect of forming an electrical connection.

The conductive ink composition may further include a curing agent.

The curing agent is a material that can cause a curing reaction for the binder to attach the metal material on the substrate. There is no limitation to the substance of the curing agent, but the curing agent to be used may include any compound in the range that one with ordinary skill in the art can select that can react with the binder included in the composition and thus be cured, for example, a compound that includes one or more amine or carboxylic anhydride in the molecule.

The curing agent included may be 1 to 30 parts by weight of the total 100 parts by weight of the first metal precursor solution, and preferably, 5 to 25 parts by weight of the total 100 parts by weight of the first metal precursor solution.

Further, the curing agent included may be in the range of 0.1 to 1.0 times the content of the binder, and preferably, 0.5 to 1.0 times the content of the binder.

If the amount of curing agent included is greater than the above range, the curing speed may increase or the electrical resistance may increase after the curing, and if the amount of curing agent included is smaller than the above range, the binder may not be cured smoothly, thus failing to provide the sufficient adhesion force, and failing to form the electrical connection with stability.

The curing accelerator may be further included in the conductive ink composition in order to accelerate the curing reaction of the curing agent and the binder. If the reaction of the curing agent and the binder occurs quickly, the problem of increased electrical resistance may occur, and if the reaction of the curing agent and the binder occurs slowly, the problem of insufficient shear stress may occur.

Thus, it is important to obtain an appropriate curing speed depending on the speed of the transcription process and the time spent, and for a means to adjust the curing speed, the curing accelerator may be included in the conductive composition.

There is no limitation to the component of the curing accelerator, but for example, an imidazole compound such as 2-methylimidazole, 2,4-dimethylimidazole, 2-ethyl-4-methylimidazole, 2-phenylimidazole, and 2-phenyl-4-methylimidazole; a tertiary amine compound such as triethylamine, benzyldimetylamine, methylbenzyldimethylamine, 2-(dimethylaminomethyl) phenol, 2,4,6-tris(dimethylaminomethyl) phenol, triethylphosphine, tributylphosphine, and 1,8-diazabicyclo(5,4,0) undecene-7; and an organic phosphine compound such as triphenylphosphine, trimethylphosphine, triethylphosphine, tributylphosphine, tri (p-methylphenyl)phosphine (tri (4-methoxyphenyl)phosphine), and tri (nonylphenyl)phosphine may be used, and among these, it is preferable to use an organic phosphine with excellent moisture tolerance and hardness.

As the curing accelerator, two or more types of the above-mentioned compounds may be used in combinations. The curing accelerator included may be 0.1 to 17 parts by weight of the total 100 parts by weight of the first metal precursor solution, and preferably, 1 to 10 parts by weight of the total 100 parts by weight of the first metal precursor solution.

If the ratio of the curing accelerator is lower than the above range, there may be a problem of defective adhesion force due to insufficient curing of the binder, and if the ratio of the curing accelerator is higher than the above range, the curing speed may become too fast, and thereby failing to obtain a sufficient electrical conductivity.

When the conductive ink composition is cured to form a coating film, the shear stress may be 35 to 100 kgf, and preferably, 40 to 80 kgf.

A solvent is used for the purpose of dissolving or evenly mixing the above-mentioned composition included in the conductive ink composition and forming the conductive ink composition in a liquid state. There is no limitation to the component of the solvent, but it should be one that has excellent solubility in the above-mentioned composition, and low reactivity, and that is easily vaporized under curing conditions, for example, tetrahydrofuran (THF), alcohol-based solvent, ether-based solvent, sulfide-based solvent, toluene-based solvent, xylene-based solvent, benzene-based solvent, alkane-based solvent, oxane-based solvent, amine-based solvent, polyol-based solvent or diketone, amino alcohol, polyamine, ethanol amine, diethanol amine, and alkyl thiol such as ethane thiol, propane thiol, butane thiol, pentane thiol, hexane thiol, heptanes thiol, octane thiol, nonane thiol, decane thiol, and undecane thiol, or a combination thereof may be used.

There is no limitation to the content of the solvent, but if too low, it is difficult to obtain a uniform composition, and if the content is too high, the viscosity will become low and the concentration of the main composition will become low, and it will take a longer time to remove the solvent, and therefore, 10 to 80 parts by weight may be included of the total 100 parts by weight of the first metal precursor, and preferably, 20 to 50 parts by weight may be included of the total 100 parts by weight of the first metal precursor.

The conductive ink composition that includes the solvent may be in a liquid form so as to be printed on the substrate, and the viscosity of the ink composition may be 5 to 1,000 cPs, and preferably, 10 to 100 cPs, when measured by Brookfield Viscometer DV3T, under 25° C. condition. If the viscosity is greater than the above range, printing will not be easy, and clogging may occur, and if the viscosity is smaller than the above range, the ink may flow on the substrate instead of agglomerating, which is a problem.

The conductive ink composition may include the first metal precursor solution and the photothermal material, and may thus be supplied with light energy from a means such as a laser, and then convert the light energy into thermal energy. The photothermal material that absorbed the light energy will generate heat so as to raise the surrounding temperature, and the first metal ion will be reduced to a first metal atom, resulting in the composition having a low electrical resistance and a high conductivity.

Further, the binder enables the conductive ink composition in a phase close to fluid to be attached on the substrate and be immobilized, and the curing agent and the curing accelerator may facilitate the curing of the binder.

The conductive ink composition of the present disclosure may be applied or printed on the substrate in a desired form and size, and subsequently, by irradiating a light or laser beam to a certain area, even for a very small local area, it is possible to raise the temperature and form a metal. Due to these characteristics, there is no limitation to the substrate that may be used, and there is no need for additional equipment for forming vacuum, thereby simplifying the process, which is an advantage.

Here, the laser used may cause a sufficient photothermal reaction and reduction reaction of the first metal ion due to the photothermal effect even under low-power conditions.

The conductive ink composition may be formed in a fine size in a narrow area, and may be used to provide an electrical connection. For example, the conductive ink composition may be used to repair defects such as disconnections that occur in the process of forming an electrode of a thin film transistor, a micro unit device and the like.

The conductive ink composition may be printed on the substrate, wherein the conductive ink composition may be printed to electrically connect two or more different points, thereby providing a conductive coating film on the substrate.

For example, the conductive ink composition of the present disclosure may be printed so as to electrically connect disconnected points of a substrate electrode, and raise the temperature using a laser for the disconnected part instead of the entire substrate, and the conductive metal may form an electrode in the form of a coating film, for example, thereby electrically connecting the disconnected part. The conductive coating film may be immobilized on the substrate or the substrate electrode by the binder cured by the reaction and the curing accelerator, providing the electrical connection with stability.

There is no limitation to the size, thickness and form of the conductive coating film, and its length may be approximately 10 to 100 µm, and the line width may be provided in a linear form of 0.1 to 20 µm.

Using the conductive ink composition of an embodiment of the present disclosure, it is possible to provide a conductive coating film having a distance between electrodes that is 40 µm and a line width of 3 µm on the substrate.

The electrical resistance of the conductive coating film will vary depending on the length and cross-sectional size area of the formed conductive coating film.

When measuring a line resistance between an electrode and another electrode or two points connected by the conductive coating film in a 2-point probe method using an ohmmeter, the value of the line resistance measured under the condition where the distance of the measurement point is 40 µm should be in the range of 5 to 100Ω/40 µm, and preferably 20 to 50Ω/40 µm.

If the line resistance is greater than the above range, the electrical connection may become poor, thereby generating heat or energy loss, and if the line resistance is smaller than the above range, the ratio of the first metal will increase, leading to insufficient substrate adhesion force or broader cross-sectional size area, thereby making it difficult to repair the fine disconnection and less economical.

The characteristics, structure and effects exemplified in each of the above-mentioned embodiments may be implemented in a different combination or form by one with ordinary knowledge in the field where the embodiments pertain to. Therefore, the contents relevant to such combination and form should be construed to be included in the scope of the present disclosure.

EMBODIMENTS

Embodiment 1

A heating mantle equipped with a stirrer and a 250 ml 3-Neck Round Bottom Flask were prepared, and 5.0 g of silver oxide ($Ag_2O$) was put into the 3-Neck Round Bottom Flask. Then, 60 g of methanol anhydrous was put into the 3-Neck Round Bottom Flask, while maintaining the temperature at 30° C. and stirring with the stirrer at a speed of 300 rpm. Then, stirring was conducted for 24 hours, while slowing putting 2.0 g of ethylhexylacid and 4.0 g of ethylhexylamine into the 3-Neck Round Bottom Flask at a speed of 0.1 g/min and maintaining the temperature at 30° C. using a continuous metering pump (Casscience PP-150D), until the color of the solution turned from black to transparent.

Viscosities of the solution that turned transparent were measured while conducting a concentration process using a rotary evaporator under vacuum and 85° C. conditions, and by concentrating the solution until the viscosity turned 5,000 cPs, precursor solution A that includes Ag precursor as the first metal precursor was prepared.

17 g of photothermal material with an Ag nano particle diameter of 30 nm was used, and 8 g of bisphenol-A type solid epoxy resin was used as the binder.

8 g of 2-phenyl-4-methylimidazole was used as the curing accelerator.

Then, 17 g of butyl acetate and 8 g of butyl carbitol were added as solvents, thereby preparing a conductive ink composition.

Embodiment 2

A 250 ml 3-Neck Round Bottom Flask equipped with a stirrer was prepared, and 5.0 g of silver oxide ($Ag_2O$) and 0.5 g of indium oxide ($In_2O_3$) were put into the 3-Neck Round Bottom Flask. Then, after putting 20 g of acetic acid and 60 g of methanol anhydrous into the 3-Neck Round Bottom Flask, stirring was conducted using the stirrer at a speed of 300 rpm. Then, stirring was conducted for 24 hours until the solution turned transparent while slowly putting 2.0 g of 2-ethylhexylacid and 4.0 g of 2-ethylhexylamine into the 3-Neck Round Bottom Flask. A composition was prepared in the same process as Embodiment 1 except for using precursor solution B that includes an Ag-Indium precursor synthesized by concentrating the transparent solution until its viscosity reaches 4,500 cPs using a rotary evaporator under vacuum and 85° C. conditions.

Embodiment 3

Instead of Indium Oxide ($In_2O_3$), Bismuth Oxide ($Bi_2O_3$) was put in, to synthesize precursor solution C that includes Ag-Bismuth precursor. The viscosity of the solution obtained was 5,600 cPs, and a composition was prepared in the same process as Embodiment 1.

Embodiments 4 to 6

A composition was prepared in the same process as Embodiment 1 except for using Ag nano particles having 10 nm size particles, Titanium Oxide ($TiO_2$) having 5 nm size particles, and Titanium Oxide ($TiO_2$) having 20 nm size particles, as photothermal materials.

Embodiments 7 to 8

A composition was prepared in the same process as Embodiment 1 except for using 8 g of Ag nano particles having 30 nm size particles, 8 g of Silver (Ag) nano particles having 10 nm size particles, 8 g of Titanium Oxide ($TiO_2$) having 5 nm size particles, and 8 g of Silver (Ag) nano particles having 10 nm size particles, as photothermal materials.

Embodiments 9 to 10

A composition was prepared in the same process as Embodiment 1 except for using Bisphenol-A type liquid Epoxy and high molecular weight solid Epoxy, as binders.

Embodiments 11 to 12

A composition was prepared in the same process as Embodiment 1 except for using 2,4,6-Tris(dimethylaminomethyl) phenol and Tris(4-methoxyphenyl)phosphine, as curing accelerators.

Embodiments 13 to 15

A composition was prepared in the same process as Embodiment 1 except for using 17 g of butyl carbitol as a solvent, and 25 g of Bisphenol-A type solid Epoxy Resin, Bisphenol-A type liquid Epoxy and high molecular weight solid Epoxy, as binders.

Embodiment 16

A composition was prepared in the same process as Embodiment 1 except for using 17 g of nano particles of which the surface of silica particles are surrounded with Au/Ag, as a photothermal material.

Contents of Embodiments 1 to 15 are shown in the table below.

TABLE 1

| Component | Classify | Composition | Embodiment 1 | Embodiment 2 | Embodiment 3 | Embodiment 4 | Embodiment 5 | Embodiment 6 | Embodiment 7 | Embodiment 8 |
|---|---|---|---|---|---|---|---|---|---|---|
| First metal precursor | 1A | First metal precursor solution A | 100 | | | 100 | 100 | 100 | 100 | 100 |
| | 1B | First metal precursor + second metal precursor solutionB | | 100 | | | | | | |
| | 1C | First metal precursor + second metal precursor solutionC | | | 100 | | | | | |
| Photothermal material | 2A | Ag particle size 30 nm | 17 | 17 | 17 | | | | 5 | |
| | 2B | Ag particle size 10 nm | | | | 17 | | | 5 | 5 |
| | 2C | $TiO_2$ 5 nm | | | | | 17 | | | 5 |
| | 2D | $TiO_2$ 20 nm | | | | | | 17 | | |
| binder | 3A | Bisphenol-A type solid Epoxy Resin | 8 | 8 | 8 | 8 | 8 | 8 | 8 | 8 |
| | 3B | Bisphenol-A type liquid Epoxy | | | | | | | | |
| | 3C | High molecular weight solid Epoxy | | | | | | | | |
| Curing accelerator | 4A | 2-Phenyl-4-methylimidazole | 8 | 8 | 8 | 8 | 8 | 8 | 8 | 8 |
| | 4B | 2,4,6-Tris(dimethyl-aminomethyl)phenol | | | | | | | | |
| | 4C | Tris(4-methoxyphenyl) phosphine | | | | | | | | |
| solvent | 5A | Butyl actetate | 17 | 17 | 17 | 17 | 17 | 17 | 17 | 17 |
| | 5B | Butyl carbitol | 17 | 17 | 17 | 17 | 17 | 17 | 17 | 17 |
| | | Total(g) | 167 | 167 | 167 | 167 | 167 | 167 | 167 | 167 |

TABLE 2

| Component | Classify | Composition | Embodiment 9 | Embodiment 10 | Embodiment 11 | Embodiment 12 | Embodiment 13 | Embodiment 14 | Embodiment 15 |
|---|---|---|---|---|---|---|---|---|---|
| First metal precursor | 1A | First metal precursor solution A | 100 | 100 | 100 | 100 | 100 | 100 | 100 |
|  | 1B | First metal precursor + second metal precursor solutionB |  |  |  |  |  |  |  |
|  | 1C | First metal precursor + second metal precursor solutionC |  |  |  |  |  |  |  |
| Photothermal material | 2A | Ag particle size 30 nm | 17 | 17 | 17 | 17 | 17 | 17 | 17 |
|  | 2B | Ag particle size 10 nm |  |  |  |  |  |  |  |
|  | 2C | $TiO_2$ 5 nm |  |  |  |  |  |  |  |
|  | 2D | $TiO_2$ 20 nm |  |  |  |  |  |  |  |
| binder | 3A | Bisphenol-A type solid Epoxy Resin |  |  | 8 | 8 | 25 |  |  |
|  | 3B | Bisphenol-A type liquid Epoxy | 8 |  |  |  |  | 25 |  |
|  | 3C | High molecular weight solid Epoxy |  | 8 |  |  |  |  | 25 |
| Curing accelerator | 4A | 2-Phenyl-4-methylimidazole | 8 | 8 |  |  | 8 | 8 | 8 |
|  | 4B | 2,4,6-Tris(dimethyl-aminomethyl)phenol |  |  | 8 |  |  |  |  |
|  | 4C | Tris(4-methoxyphenyl)phosphine |  |  |  | 8 |  |  |  |
| solvent | 5A | Butyl acteate | 17 | 17 | 17 | 17 |  |  |  |
|  | 5B | Butyl carbitol | 17 | 17 | 17 | 17 | 17 | 17 | 17 |
|  |  | Total(g) | 167 | 167 | 167 | 167 | 167 | 167 | 167 |

COMPARATIVE EXAMPLES

Comparative Examples 1 to 3

A composition was prepared in the same process as Embodiment 1 except for additionally using butyl acetate in the solvent instead of using an adhesive, binder and curing accelerator, the weight of the butyl acetate being the same as those of the adhesive, binder and curing accelerator.

Comparative Example 4

A composition was prepared in the same process as Embodiment 1 except for adding 17 g of adhesive, 25 g of binder, and 8 g of curing accelerator, instead of the first metal precursor solution, and adding 67 g of butyl acetate and 33 g of butyl carbitol, as solvents.

Compositions of Comparative Examples 1 to 4 and masses of each composition are as shown in Table 3 below.

TABLE 3

| Component | Classify | Composition | Comparative Example 1 | Comparative Example 2 | Comparative Example 3 | Comparative Example 4 |
|---|---|---|---|---|---|---|
| First metal precursor | 1A | First metal precursor solution A | 100 | 100 | 100 |  |
|  | 1B | First metal precursor + second metal precursor solutionB |  |  |  |  |
|  | 1C | First metal precursor + second metal precursor solutionC |  |  |  |  |
| Photothermal material | 2A | Ag particle size 30 nm |  | 17 | 17 | 17 |
|  | 2B | Ag particle size 10 nm |  |  |  |  |
|  | 2C | $TiO_2$ 5 nm |  |  |  |  |
|  | 2D | $TiO_2$ 20 nm |  |  |  |  |
| binder | 3A | Bisphenol-A type solid Epoxy Resin | 8 |  | 8 |  |
|  | 3B | Bisphenol-A type liquid Epoxy |  |  |  |  |
|  | 3C | High molecular weight solid Epoxy |  |  |  | 25 |

TABLE 3-continued

| Component | Classify | Composition | Comparative Example 1 | Comparative Example 2 | Comparative Example 3 | Comparative Example 4 |
|---|---|---|---|---|---|---|
| Curing accelerator | 4A | 2-Phenyl-4-methylimidazole | 8 | 8 | | 8 |
| | 4B | 2,4,6-Tris(dimethylaminomethyl)phenol | | | | |
| | 4C | Tris(4-methoxyphenyl)phosphine | | | | |
| solvent | 5A | Butyl actetate | 33 | 25 | 25 | 67 |
| | 5B | Butyl carbitol | 17 | 17 | 17 | 33 |
| | | Total(g) | 166 | 167 | 167 | 150 |

EXPERIMENTAL EXAMPLES

Experimental Examples 1 to 19—Measurement of Resistance and Shear Stress

Experimental Example 1

The prepared conductive ink conductive was printed using an EHD-eNanojet printer of ENJET, limited, such that the line width of the ink is 3 μm, and the length between ITO film (ITO/PET) where gold (Au) pad is deposited is 40 μm. On the printed surface, a beam of intensity of 4,000 mW/cm$^2$ and size of 10 μm×10 μm was applied using a 532 nm wavelength Continuous Wave Laser of BMlaser CO., LTD. (model: ALS 532 nm CW Fiber Laser 10W).

Figure 1:
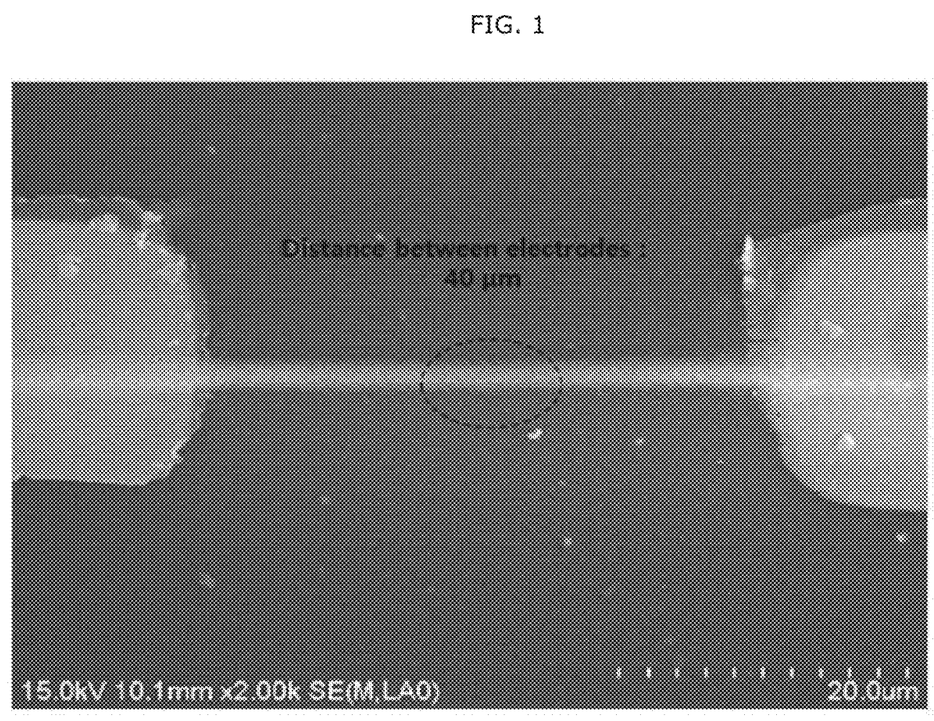
FIG. 1 is a photograph taken by a scanning microscope of an electrode connected using a composition of an embodiment of the present disclosure.
Figure 2:
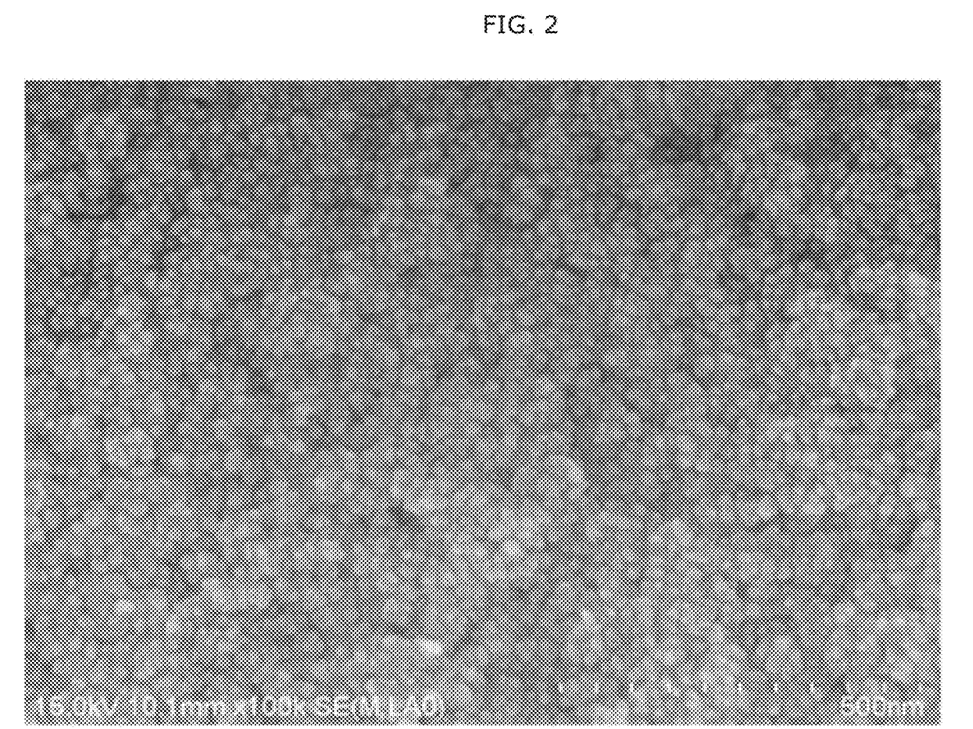
FIG. 2 is a photograph of a connection point of FIG. 1.
Figure 5:
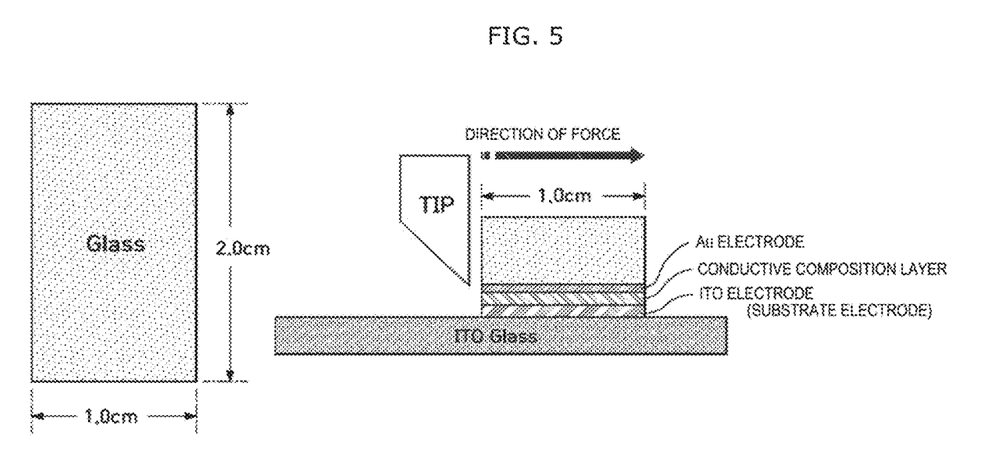
FIG. 5 is a view schematically illustrating a measurement method of a shear stress of a conductive composition.

The scanning microscope photographs (SEM) of the formed coating film are illustrated in FIGS. 1 and 2. The line resistance (52) was measured in the 2-point probe method using an ohmmeter (HIOKI RM3543) between gold (Au) pads. Shear stress was measured by spin coating the conductive ink composition of Embodiment 1 of the present disclosure to be 5 um on a glass surface (2×1 cm) where gold (Au) is deposited as illustrated in FIG. 5, and then after attaching an ITO glass (7.5×2.5 cm), applying a laser beam of 4,000 mW/cm$^2$ intensity for 10 seconds, and then pushing the lengthy side of the glass where gold (Au) is deposited using the tip of a shear stress measurement equipment (DAGE-SERIES-4000HS).

Experimental Examples 2 to 15

An electrical resistance and shear stress were measured by conducting the same experiment as Experimental Example 1 regarding Embodiments 2 to 15.

Experimental Examples 16 to 19

Figure 3:
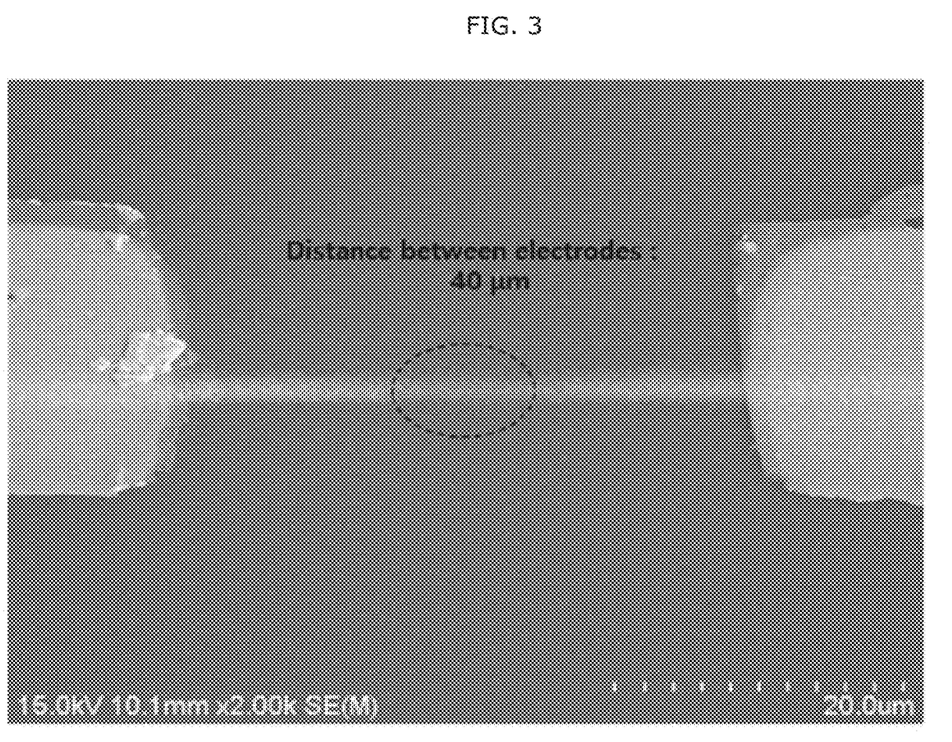
FIG. 3 is a photograph taken by a scanning microscope of an electrode connected using a composition according to a comparative example of the present disclosure.
Figure 4:
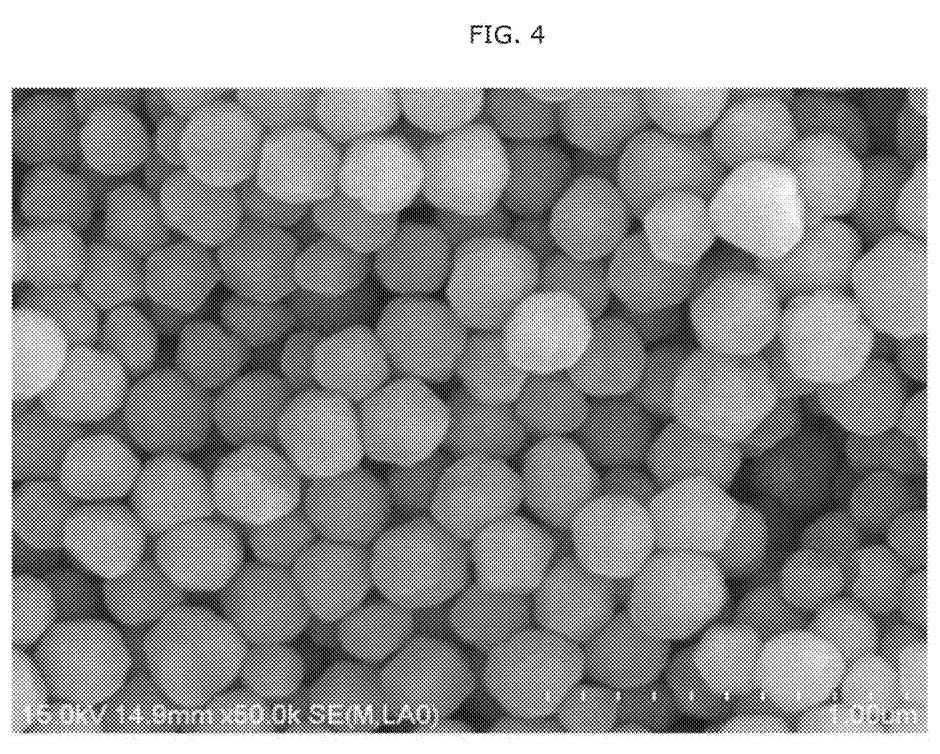
FIG. 4 is a photograph of a connection point of FIG. 2.

An electrical resistance and shear stress were measured by conducting the same experiment as Experimental Example 1 regarding Comparative Examples 1 to 4, and the scanning microscope photograph of the coating film formed in Comparative Example 1 was illustrated in FIGS. 3 and 4.

Results of Experimental Examples 1 to 19 are shown in Table 4 below.

TABLE 4

| Experimental Example | Electrical resistance(Ω/ 40 μm, 2-point probe) | Shear stress (kgf) |
|---|---|---|
| Experimental example 1 | 26.3 | 40.1 |
| Experimental example 2 | 21.3 | 58.1 |
| Experimental example 3 | 22.8 | 59.5 |
| Experimental example 4 | 32.8 | 60.7 |
| Experimental example 5 | 35.7 | 60.9 |
| Experimental example 6 | 45.7 | 60.9 |
| Experimental example 7 | 37.5 | 60.9 |
| Experimental example 8 | 37.9 | 60.9 |
| Experimental example 9 | 38.9 | 72.8 |
| Experimental example 10 | 34.7 | 75.8 |
| Experimental example 11 | 38.6 | 65.9 |
| Experimental example 12 | 34.5 | 60.5 |
| Experimental example 13 | 45.8 | 80.1 |
| Experimental example 14 | 46.1 | 79.8 |
| Experimental example 15 | 48.1 | 88.1 |
| Experimental example 16 | 560.4 | 40.9 |
| Experimental example 17 | 24.6 | 5.9 |
| Experimental example 18 | 25.8 | 11.6 |
| Experimental example 19 | Insulation | 50.8 |

Experimental Examples 20 to 22

Regarding Experimental Example 1, intensity of the laser beam was implemented as 5000, 6000 and 7000 mW/cm$^2$, and damage of the substrate was observed.

Experimental Examples 23 to 25

Regarding Comparative Example 1, intensity of the laser beam was implemented as 5000, 6000 and 7000, and damage of the substrate was observed.

Results of Experimental Examples 20 to 25 are shown in Table 5 below.

TABLE 5

| Experimental example | Electrical resistance(Ω/40 μm, 2-point probe) | Shear stress (kgf) | Damage of substrate (O/X) |
|---|---|---|---|
| Experimental example 20 | 24.8 | 39.7 | X |
| Experimental example 21 | 23.7 | 38.5 | O |
| Experimental example 22 | 23.8 | 37.9 | O |
| Experimental example 23 | 420.7 | 38.7 | X |
| Experimental example 24 | 390.5 | 39.8 | O |
| Experimental example 25 | 290.8 | 35.7 | O |

What is claimed is:

1. A conductive ink composition that can be printed on a substrate, the conductive ink composition comprising:
   a first metal precursor solution comprising a first metal ion; and
   a photothermal material;
   a binder for immobilizing the conductive ink composition on a substrate;
   a curing agent for reacting with the binder and curing the binder; and
   a curing accelerator for accelerating reaction of the binder and the curing agent,
   wherein the first metal precursor solution further comprises a second metal precursor comprising a second metal ion,
   wherein the first metal is silver (Ag),
   wherein the second metal is Bismuth (Bi),
   wherein the binder included is 7 to 50 parts by weight of 100 parts by weight of the first metal precursor solution,
   wherein the curing accelerator included is 0.1 to 17 parts by weight of 100 parts by weight of the first metal precursor solution.

2. The conductive ink composition of claim 1, wherein the first metal precursor solution comprises organic salt, inorganic salt or complex compound of the first metal.

3. The conductive ink composition of claim 1, wherein content of the first metal ion is 2 to 20 wt % of the conductive ink composition.

4. The conductive ink composition of claim 3, wherein the photothermal material comprises particles comprising a metal selected from a group consisting of Au, Al, Cu, Au, Pt, W, Cr, Ti, Co, Ni, Pb, Sn, Ge, Pd, and Si, oxide of the selected metal, or alloy of the selected metal.

5. The conductive ink composition of claim 4, wherein size of the particle of the photothermal material is 1 to 1000 nm.

6. The conductive ink composition of claim 5, wherein the photothermal material included is 5 to 30 parts by weight of 100 parts by weight of the first metal precursor solution.

7. The conductive ink composition of claim 1, wherein the binder comprises an epoxy resin.

8. The conductive ink composition of claim 1, wherein a viscosity of the conductive ink composition measured under 25° C. condition is 5 to 1000 cPs.

* * * * *